US009558433B2

(12) United States Patent
Oguro

(10) Patent No.: US 9,558,433 B2
(45) Date of Patent: Jan. 31, 2017

(54) IMAGE PROCESSING APPARATUS GENERATING PARTIALLY ERASED IMAGE DATA AND SUPPLEMENTARY DATA SUPPLEMENTING PARTIALLY ERASED IMAGE DATA

(71) Applicant: Brother Kogyo Kabushiki Kaisha, Nagoya-shi, Aichi-ken (JP)

(72) Inventor: Yuki Oguro, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/086,841

(22) Filed: Mar. 31, 2016

(65) Prior Publication Data
US 2017/0004389 A1 Jan. 5, 2017

(30) Foreign Application Priority Data

Jun. 30, 2015 (JP) ................................. 2015-130713

(51) Int. Cl.
G06K 15/00 (2006.01)
G06K 15/02 (2006.01)
(52) U.S. Cl.
CPC ....... *G06K 15/1869* (2013.01); *G06K 15/1868* (2013.01); *G06K 15/1889* (2013.01)
(58) Field of Classification Search
CPC ............ G06K 15/1869; G06K 15/1868; G06K 15/1889
USPC ........................................................ 358/1.18
See application file for complete search history.

(56) References Cited

U.S. PATENT DOCUMENTS

| 4,952,051 A | * | 8/1990 | Lovell | .................... G06T 13/80 345/473 |
| 5,029,224 A | | 7/1991 | Fujisawa | |
| 5,048,099 A | | 9/1991 | Lee | |
| 5,201,011 A | | 4/1993 | Bloomberg et al. | |

(Continued)

FOREIGN PATENT DOCUMENTS

| JP | H06-076114 A | 3/1994 |
| JP | H07-092651 A | 4/1995 |

(Continued)

OTHER PUBLICATIONS

Mar. 3, 2015—(US) Notice of Allowance—U.S. Appl. No. 14/219,169.

*Primary Examiner* — Allen H Nguyen
(74) *Attorney, Agent, or Firm* — Banner & Witcoff, Ltd.

(57) ABSTRACT

An image processing apparatus acquires target image data generated by optically reading a sheet. The sheet includes an original image and an added image. The added image is added on the sheet. The apparatus specifies, from the target image, an added region surrounded by a surrounding line. The apparatus specifies a written target in the added region. The apparatus generates partially-erased image data and supplementary data by using the target image data and a result of the specifying of the written target. The partially-erased image data represents a partially-erased image that is based on the target image with an image inside the added region being erased. The supplementary data concerns the added image. The apparatus generates an image file including the partially-erased image data and the supplementary data so that the partially-erased image and supplementary information can be reproduced in selective one of a simultaneous manner and an independent manner.

12 Claims, 12 Drawing Sheets

(56) References Cited

U.S. PATENT DOCUMENTS

| | | | |
|---|---|---|---|
| 5,339,365 A | | 8/1994 | Kawai et al. |
| 5,497,432 A | | 3/1996 | Nishida |
| 5,691,758 A | * | 11/1997 | Kamada .................... B41J 2/32 |
| | | | 347/171 |
| 6,345,118 B1 | * | 2/2002 | Ideyama ................ H04N 1/626 |
| | | | 358/537 |
| 6,674,900 B1 | | 1/2004 | Ma et al. |
| 9,031,324 B2 | | 5/2015 | Kondo |
| 2004/0162854 A1 | * | 8/2004 | Maruta .............. H04N 1/32363 |
| 2008/0174815 A1 | | 7/2008 | Komaki |
| 2012/0233535 A1 | * | 9/2012 | Piersol .................. G06F 17/241 |
| | | | 715/234 |
| 2013/0016246 A1 | * | 1/2013 | Hatanaka ................ G06T 11/00 |
| | | | 348/222.1 |
| 2014/0285861 A1 | | 9/2014 | Kondo |
| 2014/0286572 A1 | | 9/2014 | Kondo |
| 2014/0293383 A1 | | 10/2014 | Ozawa |

FOREIGN PATENT DOCUMENTS

| | | |
|---|---|---|
| JP | 2008-181485 A | 8/2008 |
| JP | 2014-182622 A | 9/2014 |

\* cited by examiner

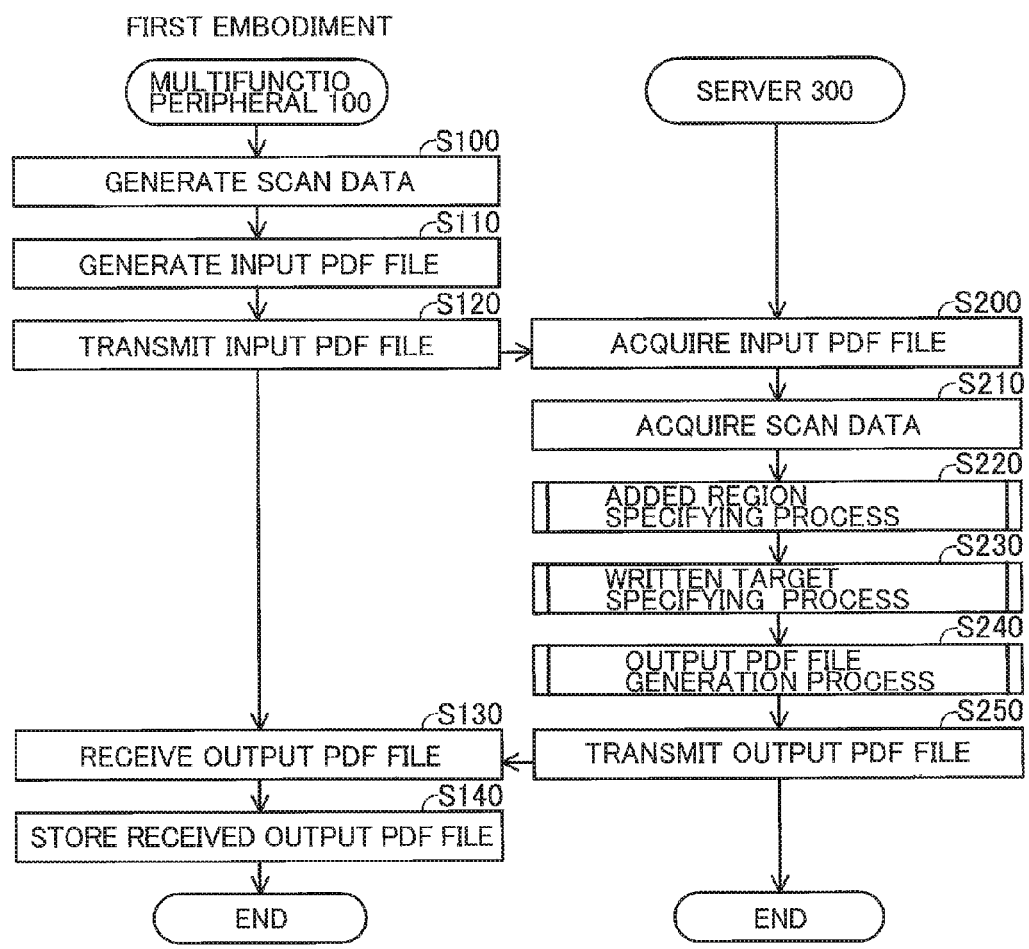

FIRST EMBODIMENT

SECOND EMBODIMENT

IMAGE PROCESSING APPARATUS GENERATING PARTIALLY ERASED IMAGE DATA AND SUPPLEMENTARY DATA SUPPLEMENTING PARTIALLY ERASED IMAGE DATA

CROSS REFERENCE TO RELATED APPLICATION

This application claims priority from Japanese Patent Application No. 2015-130713 filed Jun. 30, 2015. The entire content of the priority application is incorporated herein by reference.

TECHNICAL FIELD

The present disclosure relates to an image processing apparatus that generates an image file of a specific file format by using target image data generated by optically reading a sheet.

BACKGROUND

A PDF file can include image data and various data such as annotation and is therefore widely used for storing an electronic document with annotations. For example, a conventional image forming apparatus reads a sheet including characters or images added by handwriting to generate a PDF file including image data and the annotation data indicating the handwritten characters or images.

SUMMARY

However, in the above technology, there is a possibility that information to be treated as an annotation, that is, a written object written on the sheet cannot appropriately be identified. As a result, there may occur a problem that a user-desired PDF file cannot be generated.

In view of the foregoing, it is an object of the disclosure to provide technology that can generate a user-desired image file by appropriately specifying a written object on the sheet.

In order to attain the above and other objects, the disclosure provides an image processing apparatus including a processor, and a memory storing computer-readable instructions therein. The computer-readable instructions, when executed by the processor, causes the image-processing apparatus to perform: acquiring target image data generated by optically reading a sheet, the target image data representing a target image including an original image on the sheet and an added image, the added image being added on the sheet; specifying, from the target image, an added region surrounded by a surrounding line constituting the added image by analyzing the target image, the added region including the added image; specifying a written target in the added region by analyzing partial image data representing an image inside the added region; generating partially-erased image data and supplementary data by using the target image data and a result of the specifying of the written target, the partially-erased image data representing a partially-erased image that is based on the target image with an image inside the added region being erased, the supplementary data indicating supplementary information concerning the added image to supplement the partially-erased image; and generating an image file including the partially-erased image data and the supplementary data in a specific format so that the partially-erased image and supplementary information are capable of being reproduced in selective one of a simultaneous manner and an independent manner, in the simultaneous manner the partially-erased image and the supplementary information being reproduced simultaneously, in the independent manner the partially-erased image being reproduced and the supplementary information not being reproduced.

According to another aspects, the disclosure provides a non-transitory computer readable storage medium storing a set of program instructions thereon that, when executed by a computer, cause the computer to perform operations including: acquiring target image data generated by optically reading a sheet, the target image data representing a target image including an original image on the sheet and an added image, the added image being added on the sheet; specifying, from the target image, an added region surrounded by a surrounding line constituting the added image by analyzing the target image, the added region including the added image; specifying a written target in the added region by analyzing partial image data representing an image inside the added region; generating partially-erased image data and supplementary data by using the target image data and a result of the specifying of the written target, the partially-erased image data representing a partially-erased image that is based on the target image with an image inside the added region being erased, the supplementary data indicating supplementary information concerning the added image to supplement the partially-erased image; and generating an image file including the partially-erased image data and the supplementary data in a specific format so that the partially-erased image and supplementary information are capable of being reproduced in selective one of a simultaneous manner and an independent manner, in the simultaneous manner the partially-erased image and the supplementary information being reproduced simultaneously, in the independent manner the partially-erased image being reproduced and the supplementary information not being reproduced.

BRIEF DESCRIPTION OF THE DRAWINGS

The particular features and advantages of the disclosure as well as other objects will become apparent from the following description taken in connection with the accompanying drawings, in which:

FIG. 2 is a flowchart of operation of the system according to the first embodiment;

DETAILED DESCRIPTION

A. First Embodiment

Figure 1:
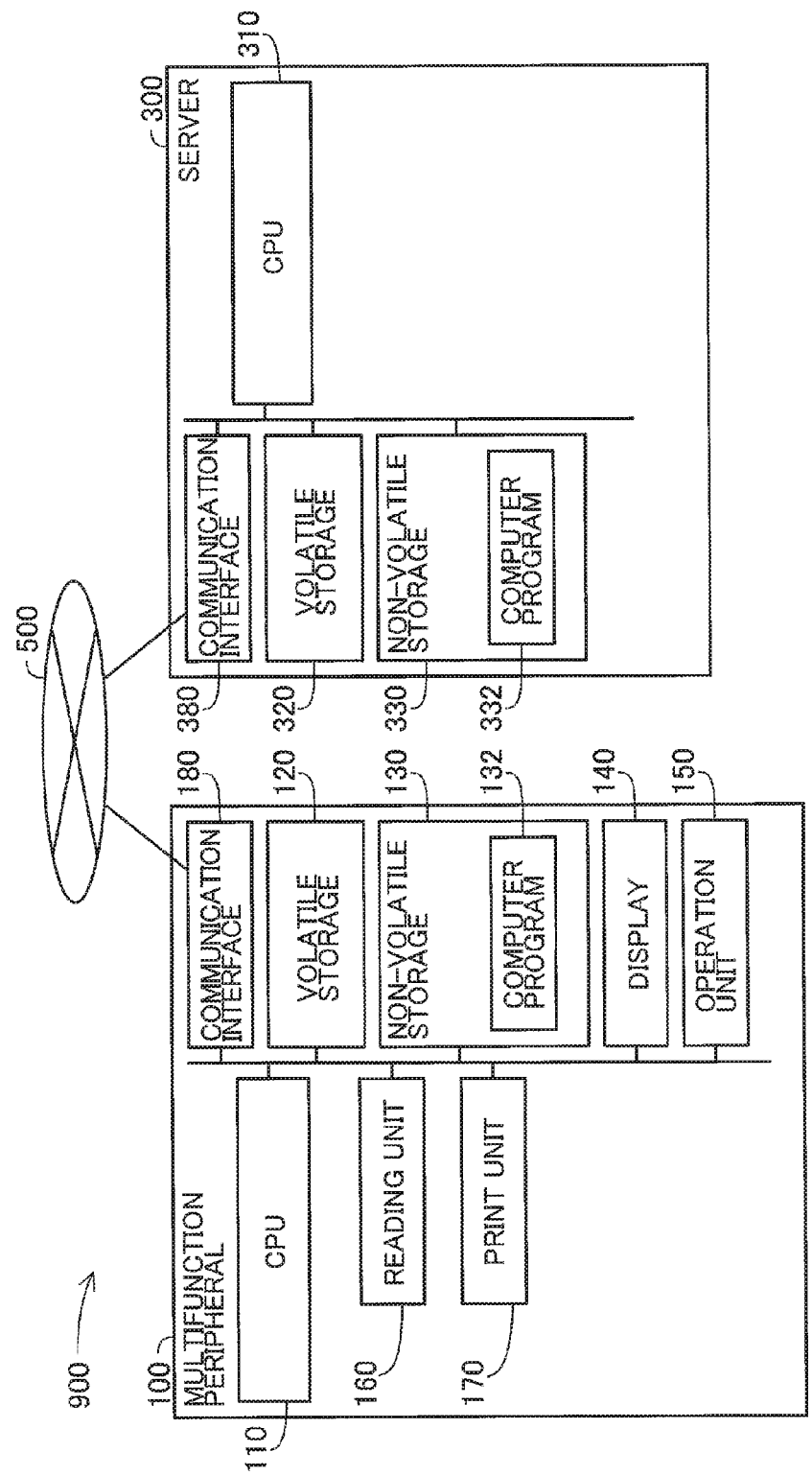
FIG. 1 is an explanatory view illustrating a system according to a first embodiment.

FIG. 1 is an explanatory view illustrating a system 900 according to a first embodiment of the present disclosure. The system 900 includes a network 500 such as Internet, a multifunction peripheral 100 and a server 300. The multifunction peripheral 100 and the server 300 are connected to the network 500.

The multifunction peripheral 100 includes a CPU 110 serving as a processor that controls the entire operation of the multifunction peripheral 100, a volatile storage 120 such as a DRAM, a non-volatile storage 130 such as a flash memory, a display 140 such as a liquid crystal panel, an operation unit 150 such as a touch panel, a reading unit 160, a print unit 170, and a wired or wireless communication interface 180 (e.g., wireless communication interface conforming to IEEE 802.11 a/b/g/n) for communication with another device (e.g., the server 300). The non-volatile storage 130 stores a computer program 132. The communication interface 180 is connected to the network 500. The computer program 132 may be stored in the non-volatile storage 130 when shipping or may be downloaded through the network 500 from a computer such as a server and installed in the non-volatile storage 130.

The reading unit 160 is a device that generates image data representing an image on a sheet. Specifically, the reading unit 160 includes an optical sensor (not shown) (e.g., a CIS (Contact Image Sensor)) and optically reads a sheet placed thereon to generate image data representing an image on a sheet. Hereinafter, the image data generated by the reading unit 160 is referred to as "scan data".

The print unit 170 is a device that prints an image and is an inkjet printer, but not limited thereto (for example, a laser printer may be adopted).

The CPU 110 executes the computer program 132 using the volatile storage 120 and the non-volatile storage 130, thereby executing a process to be described later.

The server 300 serving as an image processing apparatus of the embodiment includes a CPU 310 serving as a processor that controls the entire operation of the server 300, a volatile storage 320 such as a DRAM, a non-volatile storage 330 such as a flash memory, and a wired or wireless communication interface 380 (e.g., wired communication interface conforming to IEEE 802.3) for communication with another device (e.g., the multifunction peripheral 100). The non-volatile storage 330 stores a computer program 332. The computer program 332 may be provided in the form of e.g., a CD-ROM or downloaded through the network 500 from a computer such as another server and, then, installed in the non-volatile storage 330. The communication interface 380 is connected to the network 500.

The CPU 310 executes the computer program 332 using the volatile storage 320 and the non-volatile storage 330 to thereby execute an image process described later.

FIG. 2 is a flowchart of operation of the system 900. FIG. 2 illustrates processes to be performed by the multifunction peripheral 100 and processes to be performed by the server 300. These processes are started by the CPU 110 of the multifunction peripheral 100 when the multifunction peripheral receives a user's instruction to instruct to generate a PDF file by reading a sheet placed on the reading unit 160. The user can inputs necessary instructions (including the above user's instruction) by operating the operation unit 150.

In S100, the CPU 110 (FIG. 1) of the multifunction peripheral 100 controls the reading unit 160 to optically read a sheet ST to generate scan data representing the sheet ST. The scan data is RGB image data in a bitmap format that represents a color for each pixel using component values (in the embodiment, 256 grayscale values) of red (R), green (G), and blue (B), respectively. Hereinafter, component values of the respective red, green, and blue are referred to as "R value", "G value", and "B value". A value representing a color is referred to as "color value", and a color value including the R value, G value, and B value is referred to as "RGB value".

Figure 3A:
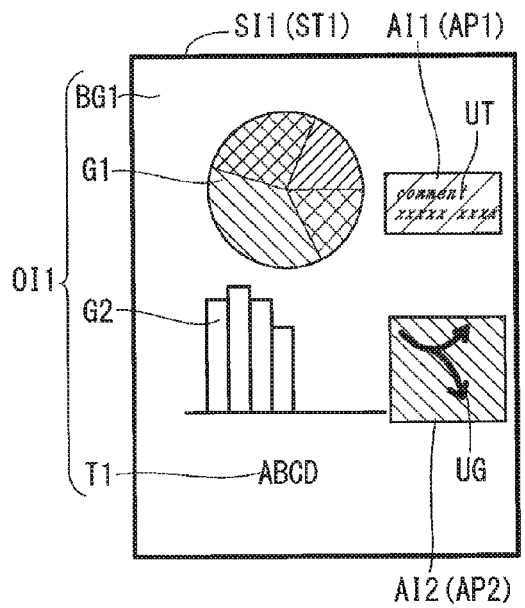
FIGS. 3A and 3B are views illustrating examples of scan images.
Figure 3B:
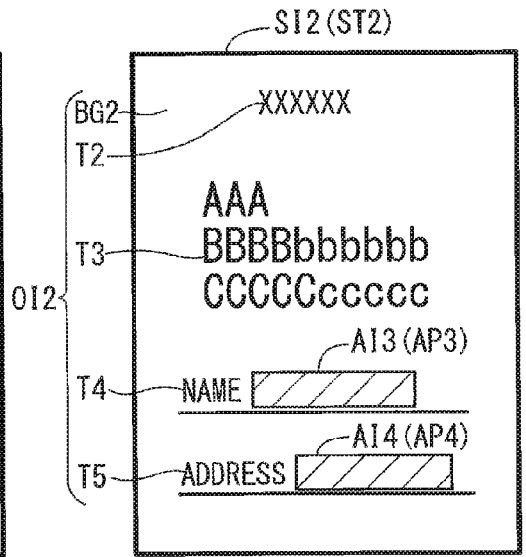

FIGS. 3A to 3D are views each illustrating examples of images used in the first embodiment. FIGS. 3A and 3B illustrate scan images SI1 and SI2, respectively, which are represented by two sets of scan data of the first embodiment. The scan images SI1 and SI2 are images representing sheet ST1 and ST2, respectively, which are read by the reading unit 160 when the respective scan data representing the images SI1 and SI2 are generated. So, FIGS. 3A and 3B also illustrate examples of the sheets ST1 and ST2.

The sheet ST1 represents an original image OI1. The original image OI1 includes a background BG1 and objects graphics G1 and G2 and a text (characters) T1. Tags AP1 and AP2 are attached (added) on the sheet ST1 by a user. The tag AP1 includes a text UT written by a user. The tag AP2 includes a graphic UG written by a user. The graphic includes, e.g., an illustration, a graph, a diagram, a vector graphic, and a pattern. The tag has a color (in the embodiment, red or blue) different from a color (in the embodiment, white) of the background BG1. In the embodiment, the tags AP1 and AP2 have different colors. Specifically, the color of the tag AP1 is blue, and color of the tag AP2 is red.

The scan image SI1 generated by reading the sheet ST1 attached with the tags AP1 and AP2 includes the original image OI1 a tag image AI1 representing the tag AP1, a tag image AI2 representing the tag AP2, the text (characters) UT in the tag image AI1, and the graphic UG in the tag image AI2.

The sheet ST2 represents an original image OI2. The original image OI2 includes a background BG2 and texts (characters) T2 to T5 as objects. Tags AP3 and AP4 are attached (added) on the sheet ST2 by a user. The tags AP3 and AP4 include no text or graphic written by a user.

The scan image SI2 generated by reading the sheet ST2 attached with the tags AP3 and AP4 includes the original image OI2, a tag image AI3 representing the tag AP3, and a tag image AI4 representing the tag AP4. The tags AP3 and AP4 have the same color (e.g., blue).

Each of the tags AP1 to AP4 is a paper having a specific shape (e.g., a rectangular shape) and each have a size smaller than that of the sheet ST. Each of the tags AP1 to AP4 is, e.g., Post-it (trademark) commercially available. In S100, scan data subject for the process is generated by reading any one of the sheets ST1 and ST2.

In S110, the CPU 110 (FIG. 1) generates a PDF file storing the generated scan data. The PDF file is an image file having a file format called PDF (Portable Document Format).

Figure 4:
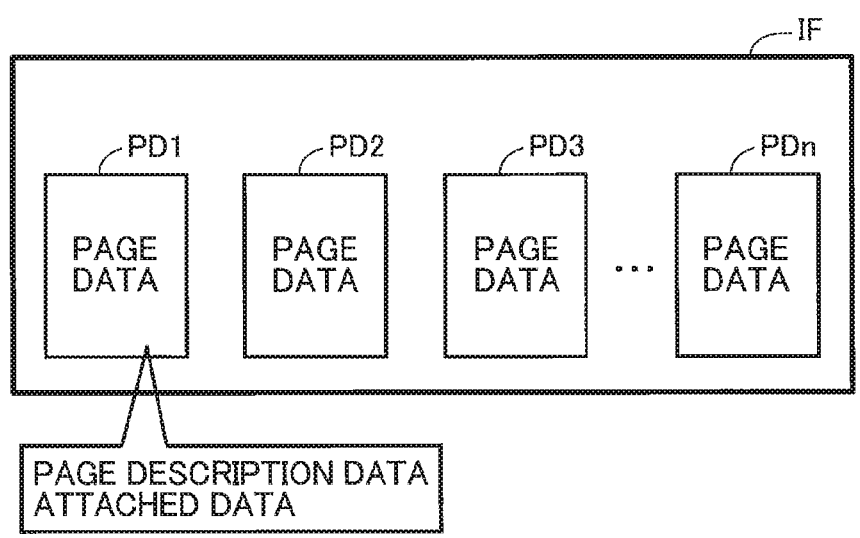
FIG. 4 is a view illustrating an example of a PDF file.

The following describes a configuration of the PDF file. FIG. 4 is a view illustrating an example of the PDF file. The PDF is a format that can store an image representing a document corresponding to n pages (n is an integer equal to or greater than 1). A PDF file IF of FIG. 4 includes n page data PD1 to PDn. In the embodiment, the PDF file IF represents an image corresponding to one page representing any one of the sheets ST1 and ST2. The PDF file generated in S110 is also referred to as an input PDF file. Each page data includes page description data representing a page image of a document corresponding to one page. The page description data can include various data such as vector data and text data. In the embodiment, the page description data includes image data, such as JPEG data obtained by compressing image data in a JPEG format (see, e.g., FIG. 5A). Each page data can include attached data. The attached data can include, e.g., supplementary information data for supplementing the page description data, such as an annotation text code TC or annotation image data IC, and an input form code FC.

Figure 5A:
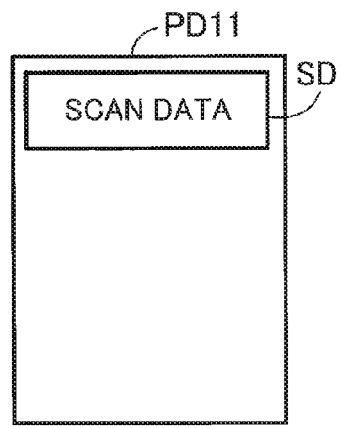
FIGS. 5A-5E are views illustrating examples of page data included in respective PDF files.
Figure 5B:
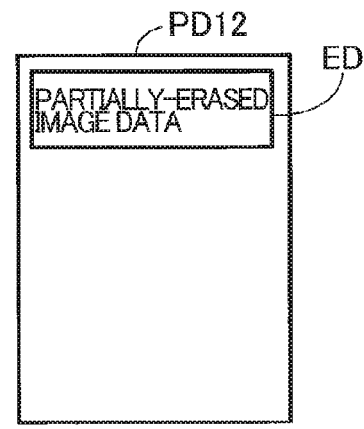

FIGS. 5A to 5E are views illustrating examples of the page data included in the PDF file. As shown in FIG. 5A, the input PDF file includes one page data PD11. The page data PD11 includes, as the above-mentioned page description data, scan data SD (compressed in a JPEG format) generated in S100.

In S120, the CPU 110 transmits the input PDF file to the server 300 via the network 500. In S200, the CPU 310 of the server 300 acquires, as an input file, the input PDF file transmitted from the multifunction peripheral 100.

In S210, the CPU 310 decompresses JPEG data included in the acquired input PDF file, thereby acquiring the scan data SD (i.e., RGB image data) generated in S100. Hereinafter, an image represented by the scan data SD (target image data) acquired in this step is referred to as a "target image".

Figure 6:
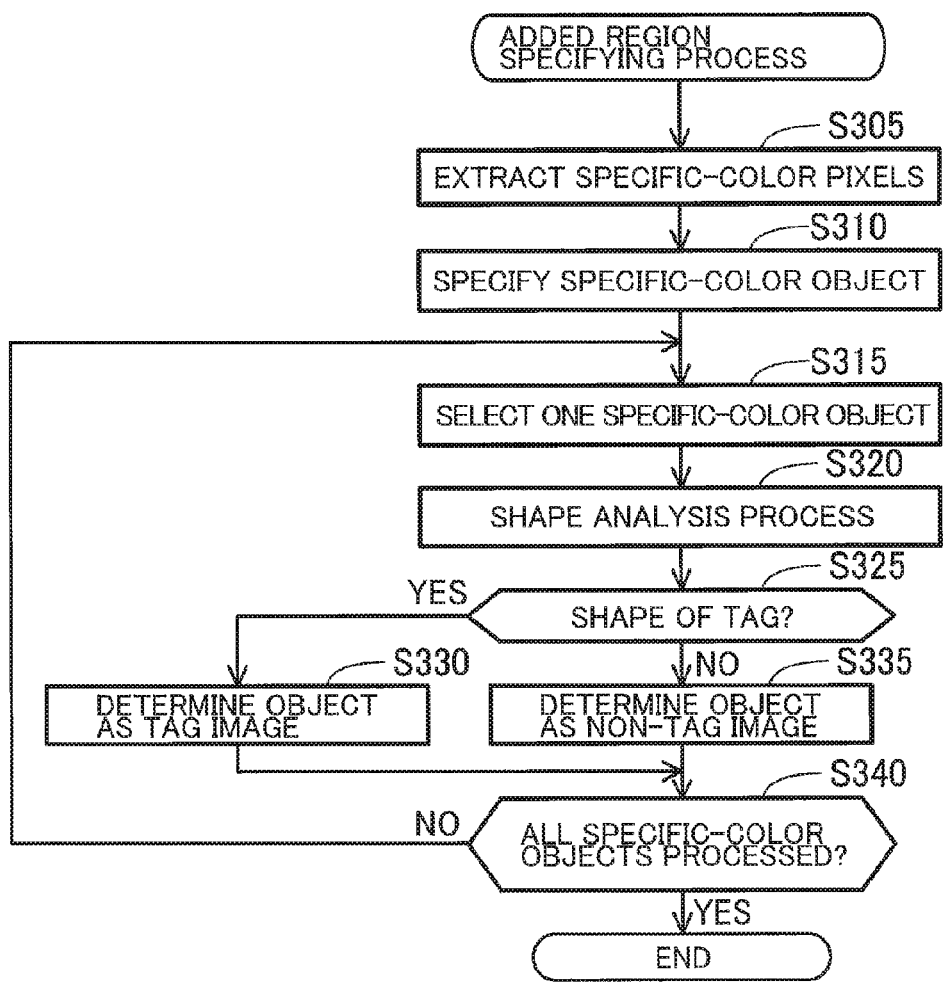
FIG. 6 is a flowchart illustrating an added region specifying process according to the first embodiment.

In S220, the CPU 310 executes an added region specifying process. The added region specifying process is a process for identifying an added region in the target image by analyzing the target image data. FIG. 6 is a flowchart of the added region specifying process. The added region specifying process of the embodiment is a process for identifying the added region by specifying the tag image of a specific color.

In S305, the CPU 310 extracts, from the target image data, a plurality of specific-color pixels having a specific color. In the embodiment, a plurality of specific-color pixels corresponding to a plurality of specific colors are extracted. For example, three colors, red, blue, and yellow, are generally used for the tag. Accordingly, three specific-color pixels corresponding to three colors, red, blue, and yellow are extracted in the embodiment. That is, red color pixels, blue color pixels, and yellow color pixels are extracted. Specifically, three specific-color ranges corresponding to the three colors are individually defined and stored in the non-volatile storage 330. For example, a red color range is a range of the RGB value that satisfies ranges of components of the RGB value, i.e., $R1 \leq R \leq R2$, $G1 \leq G \leq G2$, and $B1 \leq B \leq B2$. Blue- and yellow-color ranges are defined in the same way. Among a plurality of pixels that constitute the target image, the red color pixels are pixels having the RGB value in the red color range, the blue color pixels are pixels having the RGB value in the blue color range, and yellow color pixels are pixels having the RGB value in the yellow color range. Non-specific-color pixels are pixels different from the specific-color pixels, i.e., pixels having the RGB value not belonging to any of the three specific-color ranges.

The CPU 310 generates extracted image data including a plurality of pixels having one-to-one correspondence with a plurality of pixels constituting the target image. In the extracted image data, a value of the pixels corresponding to the non-specific-color pixels is set to "0", a value of the pixels corresponding to the red color pixel is set to "1", a value of the pixels corresponding to the blue color pixel is set to "2", and a value of the pixels corresponding to the yellow color pixel is set to "3".

Figure 3C:
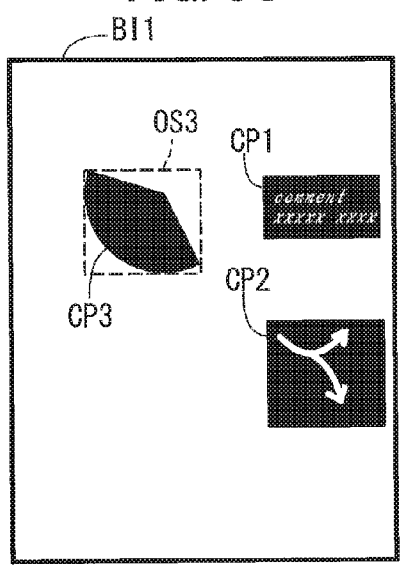
FIGS. 3C and 3D are views illustrating examples of extracted images.
Figure 3D:
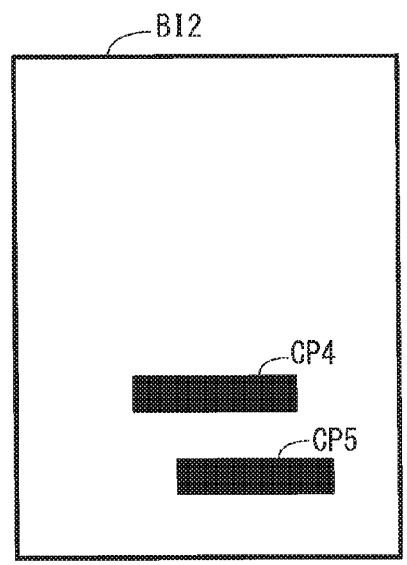

In S310, the CPU 310 specifies specific-color object(s) constituted of one-specific-color pixels on the basis of the extracted image data. Specifically, the CPU 310 specifies, as one specific-color object, a specific-color-pixel group constituted of continuous one or more one-specific-color pixels (specific-color pixels for one color). Each of FIGS. 3C and 3D illustrates an example of the specific-color object. An extracted image BI1 of FIG. 3C corresponds to the scan image SI1 of FIG. 3A. An extracted image BI2 of FIG. 3D corresponds to the scan image SI2 of FIG. 3B. Each black areas in the extracted images BI1 and BI2 represents a range of the specific-color object, while each of white areas in the extracted images BI1 and BI2 represents a range where no specific-color object exists. In the extracted image BI1 of FIG. 3C, specific-color objects CP1 and CP2 corresponding respectively to the tag images AI1 and AI2 are specified, and a specific-color object CP3 corresponding to a part of the graphic G1 different from the tag image is specified. In the extracted image BI2 of FIG. 3D, specific-color objects CP4 and CP5 corresponding respectively to the tag images AI3 and AI4 are specified. In this step, label image data and color data are generated. In the label image data, a label (pixel value) is attached to each of one or more pixels constituting each specific-color object. The color data represents a color (one of the plurality of specific colors) of each specific-color object.

In S315, the CPU 310 selects one specific-color object from a plurality of specific-color objects specified in S310. In S320, the CPU 310 executes a shape analysis process for the selected specific-color object (target specific-color object) on the basis of the extracted image data. The shape analysis process determines whether the specific-color object has a shape corresponding to the tag. Specifically, the CPU 310 calculates a matching ratio MR between a reference object having a shape of the tag and the target specific-color object. A specific example will be described in a case where the specific-color object CP3 shown in FIG. 3C is the target specific-color object. The CPU 310 specifies a circumscribed rectangle OS3 of the specific-color object CP3. Then, the CPU 310 specifies a rectangular object having the same size as that of the circumscribed rectangle OS3 as a reference object. Then, the CPU 310 overlaps the specific-color object CP3 with the reference object so that a reference pixel (e.g., topmost and leftmost pixel) of the circumscribed rectangle OS3 is coincides with a reference pixel (e.g., topmost and leftmost pixel) of the reference object. In this state, the CPU 310 calculates the number of pixels that is included in the reference object and overlaps with the specific-color pixels constituting the specific-color object CP3, as the number VN. Then, the CPU 310 calculates the matching ratio MR (=(VN/TN)) of the number VN to a total number TN of the pixels included in the reference object. When the matching ratio MR is equal to or larger than a prescribed threshold value TH1 (e.g., 0.7), the CPU 310 determines that the specific-color object CP3 has a shape of the tag. On the other hand, when the matching ratio MR is less than the prescribed threshold value TH1, the CPU 310 determines that the specific-color object CP3 does not have a shape of the tag. The method for determining whether the target specific-color object has a shape of the tag is not limited to this. For example, a condition for determination may include a condition that the target specific-color object has a size regarded as the tag, more specifically, a condition that the number of pixels in both vertical and horizontal directions are equal to or larger than the number of pixels corresponding to 5 mm on the document and are equal to or less than the number of pixels corresponding to 15 cm on the document.

In S325, the CPU 310 determines whether a result of the shape analysis process indicates that the target specific-color object has the shape of the tag. When the target specific-color object has the shape of the tag (S325: YES), in S330 the CPU 310 determines that the target specific-color object is the tag image representing the tag and stores information indicating a position, a size, and a color of the tag image in the volatile storage 320. For example, this information is coordinates represented in a two-dimensional coordinate system defined in the target image, more specifically, a coordinate of topmost and leftmost pixel of the rectangular target image (or the circumscribed rectangle of the tag image) and a coordinate of lowermost and rightmost pixel in the rectangular tag image (or the circumscribed rectangle of the tag image). In the embodiment, a region surrounded by an outer edge (outline) of the tag image is an added region, so that the identification of the tag image indicates identification of the added region. On the other hand, when the CPU 310 determines that the target specific-color object does not have a shape of the tag (S325: NO), in S335 the CPU 310 determines that the target specific-color object is not the tag image.

In S340, the CPU 310 determines whether all the specific-color objects in the target image have been processed. When the CPU 310 determines that there is any unprocessed specific-color object (S340: NO), the CPU 310 returns to S315 and selects an unprocessed specific-color object. When the CPU 310 determines that all the specific-color objects in the target image have been processed (S340: YES), the CPU 310 ends the added region specifying process of FIG. 6.

When the target image data is the scan data representing the scan image SI1 shown in FIG. 3A, the CPU 310 specifies the tag images AI1 and AI2 corresponding to the specific-color objects CP1 and CP2 shown in FIG. 3C in the added region specifying process. When the target image is the scan data representing the scan image SI2 shown in FIG. 3B, the CPU 310 specifies the tag images AI3 and AI4 corresponding to the specific-color objects CP4 and CP5 shown in FIG. 3D in the added region specifying process.

After completion of the added region specifying process, the CPU 310 executes a written target specifying process in S230 of FIG. 2. The written target specifying process identifies a written target in the added region by analyzing partial image data representing an image in the added region defined by the tag image. The written target indicates an object that a user has written in the added region. More specifically, in the embodiment, the written target corresponds to information that the user has written in the tags attached to the sheets ST1 and ST2.

Figure 7:
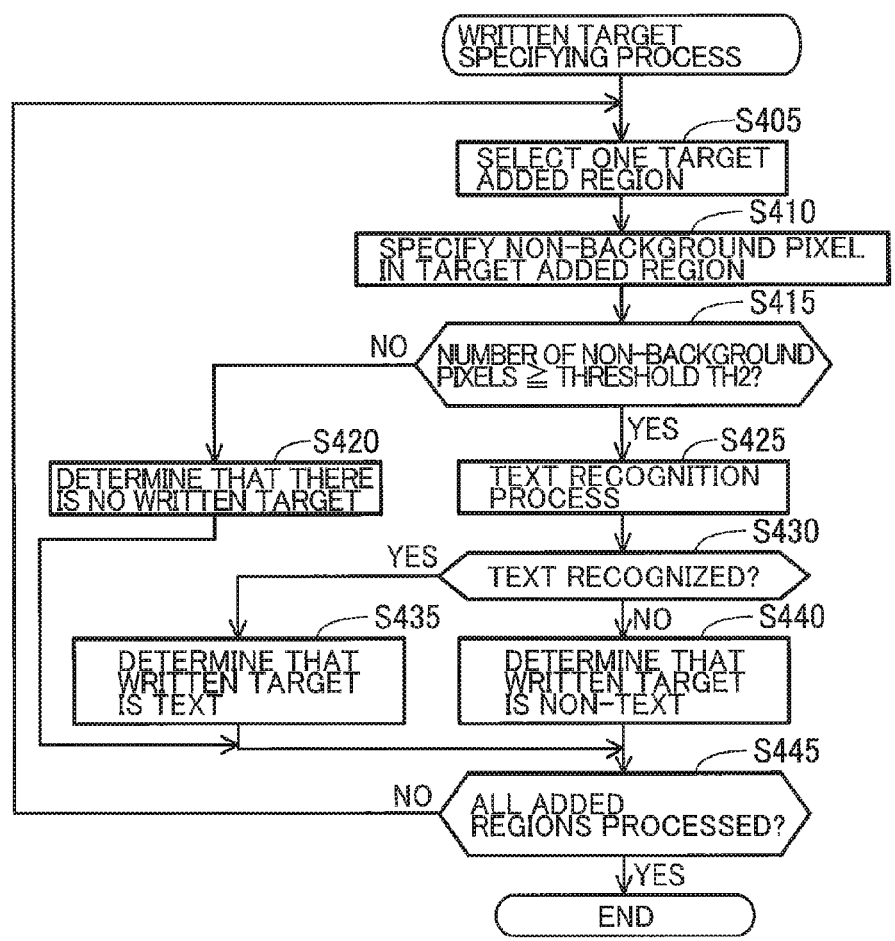
FIG. 7 is a flowchart illustrating a written target specifying process according to the first embodiment.

FIG. 7 is a flowchart of the written target specifying process. In S405, the CPU 310 selects one target added region from at least one added region defined, respectively, by at least one tag image. In the embodiment, a region surrounded by an outer edge (outline) of the tag image specified in the added region specifying process is defined as the added region. In other words, a region inside the tag image is defined as the added region. Therefore, in the embodiment, selection of one added region corresponds to selection of one specified tag image.

In S410, the CPU 310 specifies non-background pixels in the target added region selected from the target image data.

Specifically, the CPU 310 calculates an average value of the RGB values of a plurality of pixels positioned on an outer edge (outline) of the tag image defining the target added region as a background color BC (R_b, G_b, B_b) of the target added region. Then, the CPU 310 determines a background color range BR on the basis of the calculated background color BC. For example, the background color range BR is an RGB value range that satisfies, $(R\_b-\Delta V) \leq R \leq (R\_b+\Delta V)$, $(G\_b-\Delta V) \leq G \leq (G\_b+\Delta V)$, and $(B\_b-\Delta V) \leq B \leq (B\_b+\Delta V)$. The $\Delta V$ is a prescribed value and, when each of RGB component values can have 256 gradation values, $\Delta V$ is 10. The partial image data representing the image in the target added region includes a plurality of partial-image pixels. The CPU 310 classifies the plurality of partial-image pixels into a background pixel group and a non-background pixel group. More specifically, the pixels having the RGB values in the background color range BR is classified into the background pixel group, and the pixels having the RGB values out of the background color range BR is classified into the non-background pixel group, whereby the partial image data is binarized. As a result, in the target added region, the CPU 310 identifies a plurality of background pixels representing the background of the target added region and a plurality of non-background pixels representing color different from that of the background pixels in the target added region. That is, the plurality of background pixels is pixels classified into the background pixel group and the plurality of non-background pixels is pixels classified into the non-background pixel group.

In S415, the CPU 310 determines whether the number of the non-background pixels specified in the target added region is equal to or greater than a threshold value TH2. The threshold value TH2 is previously determined so that when any text (or character) or graphic that the user has written exists in the added region, it is determined that the number of the non-background pixels that constitute the text (or character) or graphic is equal to or greater than the threshold value TH2 and that when no text or graphic that the user has written exists in the added region, it is determined that the number of the non-background pixels that constitute the text or graphic is less than the threshold value TH2. Considering occurrence of noise pixels which may be determined as the non-background pixels in spite of absence of the text or graphic that the user has written, the threshold value TH2 is set to a prescribed percentage (e.g., 3%) of the total number of pixels included in the target added region. For example, when each of the tag images AI1 and AI2 shown in FIG. 3A is set as the target added region, the number of the specified non-background pixels is determined to be equal to or greater than the threshold value TH2. When each of the tag images AI3 and AI4 shown in FIG. 3B is set as the target added region, the number of the specified non-background pixels is determined to be less than the threshold value TH2.

When the number of the non-background pixels is less than the threshold value TH2 (S415: NO), in S420 the CPU 310 determines that there is no written target in the added region and advances to S445.

When the number of the non-background pixels is equal to or greater than the threshold value TH2 (S415: YES), in S425 the CPU 310 executes a text (or character) recognition process on the partial image data representing the image in the added region so as to determine whether the non-background pixel group in the added region represents the text (or character). In the embodiment, the text recognition process is a known OCR (Optical Character Recognition) technology, for example. When the text (character) has been recognized, the CPU 310 generates text data representing the recognized text (or character) and stores the text data in a buffer area of the volatile storage 320 in association with the target added region.

In S430, the CPU 310 determines whether the text (character) has been recognized in the text recognition process in S425. For example, when the tag image AI1 of FIG. 3A is the image in the target added region, the text is recognized in the text recognition process. When the tag image AI2 of FIG. 3B is the image in the target added region, the text (character) is not recognized in the text recognition process. When the text has been recognized (S430: YES), in S435 the CPU 310 determines that the written target in the added region is the text (or character) and stores information that the written target in the added region is the text (or character) in the non-volatile storage 320, and advances to S445. When the text has not been recognized (S430: NO), in S440 the CPU 310 determines that the written target in the added region is non-text and advances to S445.

In S445, the CPU 310 determines whether all the added regions have been processed. When there is any unprocessed added region (S445: NO), the CPU 310 returns to S405 and selects the unprocessed added region. When all the added region have been processed (S445: YES), the CPU 310 ends the written target specifying process.

After completion of the written target specifying process, the CPU 310 executes an output PDF file generation process (hereinafter, simply referred to as "file generation process") in S240 of FIG. 2. The file generation process generates an output PDF file using a result of the written target specifying process shown in FIG. 7 and target image data. Although described later in detail, the output PDF file includes image data based on the target image data and the above-described added data.

Figure 8:
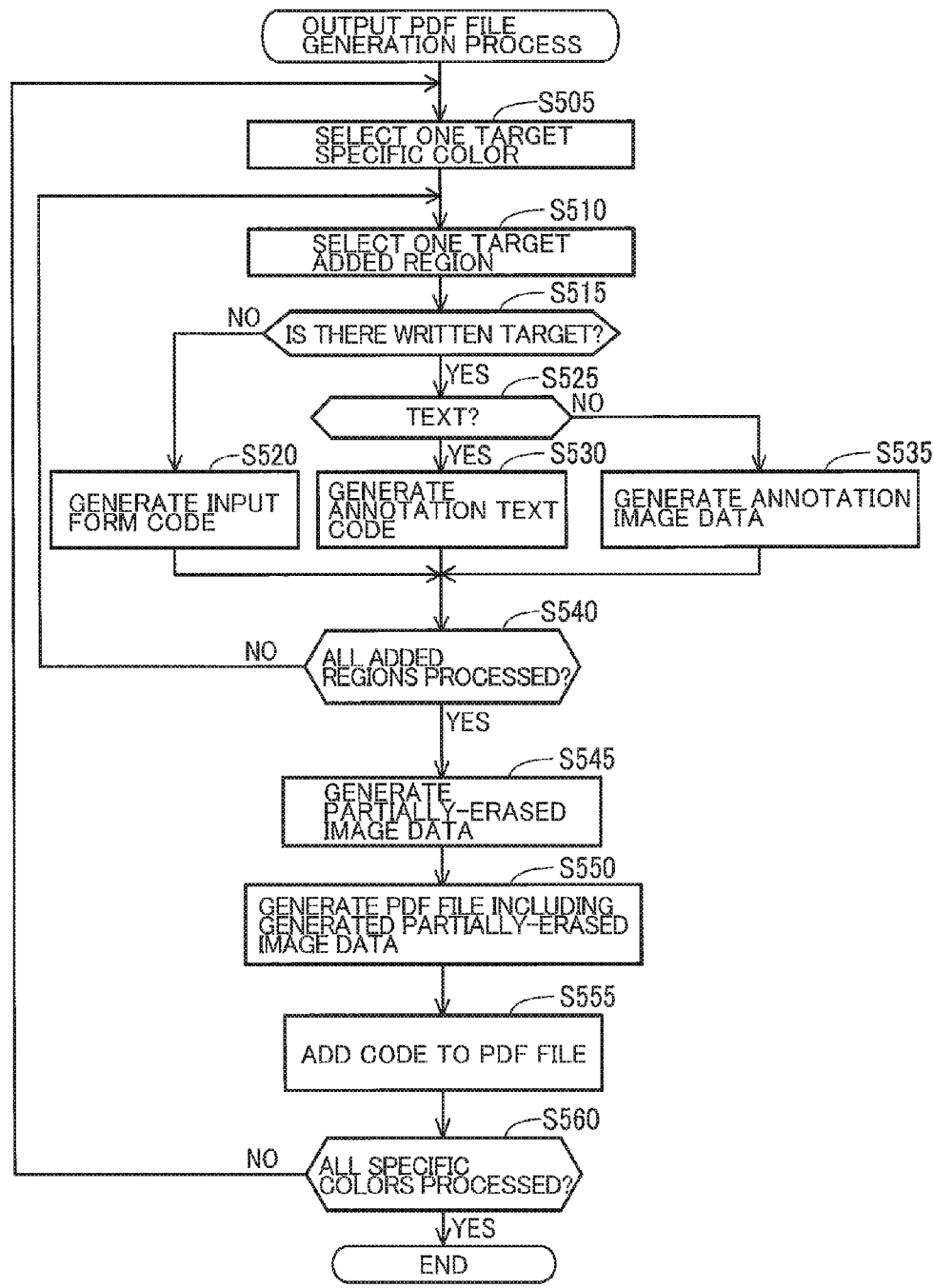
FIG. 8 is a flowchart illustrating an output PDF file generation process according to the first embodiment.

FIG. 8 is a flowchart illustrating the file generation process. In S505, the CPU 310 selects one target specific color from the colors (specific colors) of the tag images specified in the target image. For example, when the two types of the tag images (red tag image and blue tag image) are specified in the target image, red is selected as the target specific color in S505 (first time), and blue is selected as the target specific color in S505 (second time).

In S510, the CPU 310 selects one target added region from at least one added region defined by at least one tag image having the target specific color.

In S515, the CPU 310 determines in the written target specifying process, there is any written target (text (character), or non-text) in the target added region. When there is no written target in the target added region (S515: NO), in S520 the CPU 310 generates an input form code FC as the added data. The input form code FC defines an input box for receiving user's input of text (character). The input box is disposed in a page image represented by the page description data included in the page data of the output PDF file. As shown in FIG. 4, the page data includes the page description data and added data. In the embodiment, the page description data is JPEG data representing the page image (i.e., partially-erased image to be described later). The input form code FC includes information indicating the input box, size information indicating a size of the input box, and position information indicating a position of the input box in the page image. Each of the size information and the position information of the input box may be coordinate information indicating the size and position of the corresponding tag image in the target image. For example, when each of the regions of the tag images AI3 and AI4 of FIG. 3B is set as the target added region, an input form code FC is generated for each tag image in S515.

When there is a written target in the target added region (S515: YES), in S525 the CPU 310 determines whether the written target is the text or non-text. When the written target is the text (S525: YES), in S530 the CPU 310 generates an annotation text code TC. The annotation text code TC defines a text (or character) for supplementing the page image. The annotation text code includes text data representing the text (or character) and position information indicating a position with which the text is associated in the page image, for example. The text data represents the text (character) that the user has written in the target added region, that is, the text identified in the text recognition process S425 shown in FIG. 7. The position information may be coordinate information indicating the position of the corresponding tag image in the target image. For example, when the region of the tag image AI1 shown FIG. 3A is set as the target added region, the annotation text code TC is generated in this step.

When the written target is the non-text (S525: NO), in S535 the CPU 310 generates annotation image data IC. The annotation image data IC represents an image for supplementing the page image. The annotation image data IC includes an image file representing an image for supplementing the page image and position information indicating a position with which the image is associated in the page image, for example. The image file in the annotation image data IC represents an image in the target added region, more specifically, the tag image corresponding to the target added region in the embodiment. The CPU 310 trims the target image along an outer edge of the corresponding tag image to cut out an image inside the outer edge (outline), and thus extracts partial image data representing an inside of the outer edge of the corresponding tag image from the target image data. Then, the CPU 310 converts the partial image data into JPEG format data, thereby generating an image file for annotation image data IC. The CPU 310 generates position information indicating a position an image represented by the image file is associated in the page image, for example. The position information may be coordinate information indicating the position of the corresponding tag image in the target image. For example, when the area of the tag image AI2 shown in FIG. 3A is set as the target added region, the annotation image data IC is generated in this step.

Each of the input form code FC, the annotation image data IC, and the annotation text code TC is described according to PDF standard (e.g., ISO-32000-1: 2008). Each of the annotation data such as the annotation image data IC and the annotation text code TC is be associated with the page image in a separated manner therefrom.

In S540, the CPU 310 determines whether all the added regions defined by the tag images having the target specific color have been processed. When there is an unprocessed added region (S540: NO), the CPU 310 returns to S510 and selects the unprocessed added region. When all the added regions have been processed (S540: YES), the CPU 310 advances to S545.

In S545, the CPU 310 generates partially-erased image data representing a partially-erased image obtained by erasing images inside all the added regions from the target image. For example, the partially-erased image data is generated so that the RGB values of a plurality of pixels in each added region are substituted by an RGB value representing a background color (e.g., white) of the target image. In the embodiment, the image inside the added region is the tag image itself identified in the added region specifying process shown in FIG. 6 (that is, the image inside the outer edge of the tag image). Therefore, in the embodiment, the RGB values of a plurality of pixels constituting the tag image specified in the added region specifying process are substituted by an RGB value representing a background of the target image.

In S550, the CPU 310 generates a PDF file including the generated partially-erased image data. Specifically, the CPU 310 generates a PDF file including page data PD12 illustrated in FIG. 5B in place of the page data PD11 illustrated in FIG. 5A. The page data PD12 includes JPEG-compressed partially-erased image data ED as the page description data.

Figure 5C:
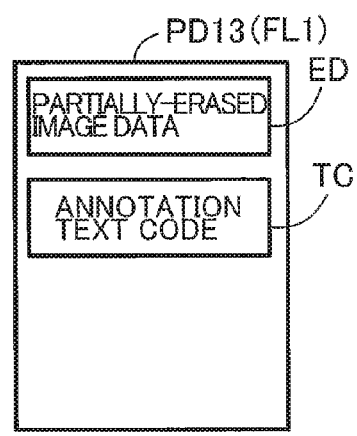
Figure 5D:
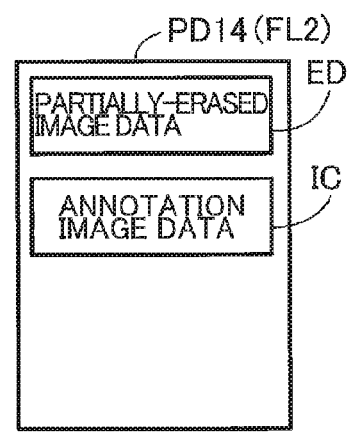
Figure 5E:
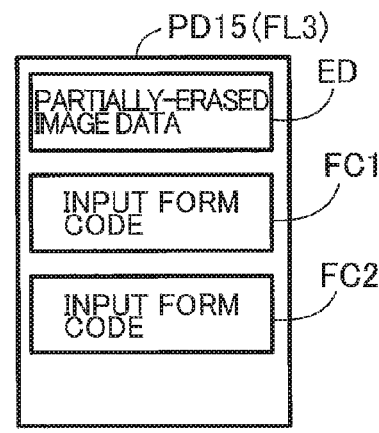

In S555, the CPU 310 adds, as the attached data, at least one of the annotation text code TC, the input form code FC, and the annotation image data IC generated respectively in S520, S530, and S535 to the page data (e.g., page data PD12 of FIG. 5B) included in the PDF file generated in S550. Specifically, by adding each code to the page data PD12 of FIG. 5B, one of page data of FIGS. 5C to 5E is generated. FIG. 5C illustrates page data PD13 generated for the tag image AI1 of FIG. 3A when the scan data representing the scan image SI1 shown in FIG. 3A is the target image data. FIG. 5D illustrates page data PD14 generated for the tag image AI2 shown in FIG. 3A when the scan data representing the scan image SI1 of FIG. 3A is the target image data. FIG. 5E illustrates page data PD15 generated when the scan data representing the scan image SI2 shown in FIG. 3B is the target image data. As a result, an output PDF file for the target specific data is generated.

In S560, the CPU 310 determines whether all the specific colors of the tag image specified in the target image have been processed as the target specific colors. When there is an unprocessed color (S560: NO), the CPU 310 returns to S505 and selects an unprocessed specific color. When all the specific colors have been processed (S560: YES), the CPU 310 ends the file generation process.

As a result of the file generation process described above, one output PDF file is generated for each color of the tag image included in the target image. For example, the scan image SI1 of FIG. 3A includes tag images AI1 and AI2 each having one specific color. Thus, when the scan data representing the scan image SI1 is the target image data, two output PDF files corresponding to the respective two specific colors are generated. The two output PDF files include an output file FL1 having the page data PD13 shown in FIG. 5C and an output file FL2 having the page data PD14 shown in FIG. 5D. The scan image SI2 of FIG. 3B includes two tag images AI3 and AI4 having one specific color. The output PDF file includes an output file FL3 having the page data PD15 shown in FIG. 5E.

In the example shown in FIG. 3A, the target image data is the scan data representing the scan image SI1 including a first tag image AI1 having a first color (e.g., blue) and a second tag image AI2 having a second color (e.g., red). In this case, a first added region defined by the first tag image AI1 and a second added region defined by the second tag image AI2 are identified in the added region specifying process shown in FIG. 6. Then, in the file generation process shown in FIG. 8, the CPU 310 generates: a first output PDF file FL1 including the annotation text code TC corresponding to the image (specifically, written target which is the text) inside the first added region: and a second output PDF file FL2 including the annotation image data IC corresponding to the image (specifically, written target which is the graphic) inside the second added region. As a result, the user can easily generate output PDF files corresponding to the number of colors of the attached tags by simply attaching a plurality of types of tags having different colors from one another to one sheet.

In the example shown in FIG. 3B, the target image data is the scan data representing the scan image SI2. In this case, the CPU 310 generates one output PDF file FL corresponding to one specific color. The one output PDF file FL3 is an output PDF file including the page data PD15 of FIG. 5E.

After completion of the file generation process, in S250 (FIG. 2) the CPU 310 transmits the generated PDF file to the multifunction peripheral 100 via the network 500. In S130, the CPU 110 of the multifunction peripheral 100 receives the output PDF file from the server 300. In S140, the CPU 110 stores the received output PDF file in the non-volatile storage 130, for example. The stored output PDF file is used by the user. For example, the user can store the output PDF file in a user's terminal device and reproduce the output PDF file by using a known PDF viewer. Specifically, the user can display and print an image represented by the output PDF file.

Figure 9A:
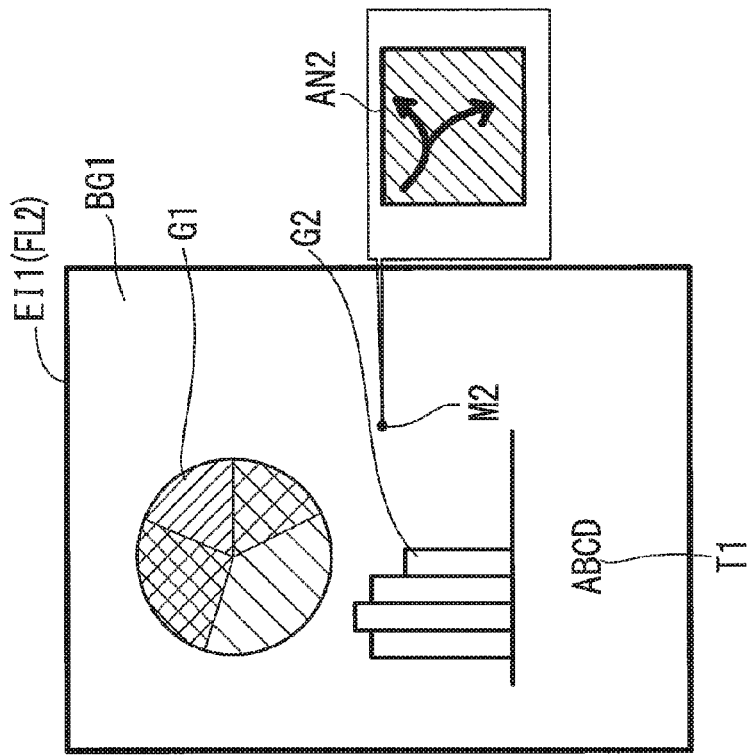
FIGS. 9A and 9B are views illustrating output PDF files displayed using a viewer.
Figure 9B:
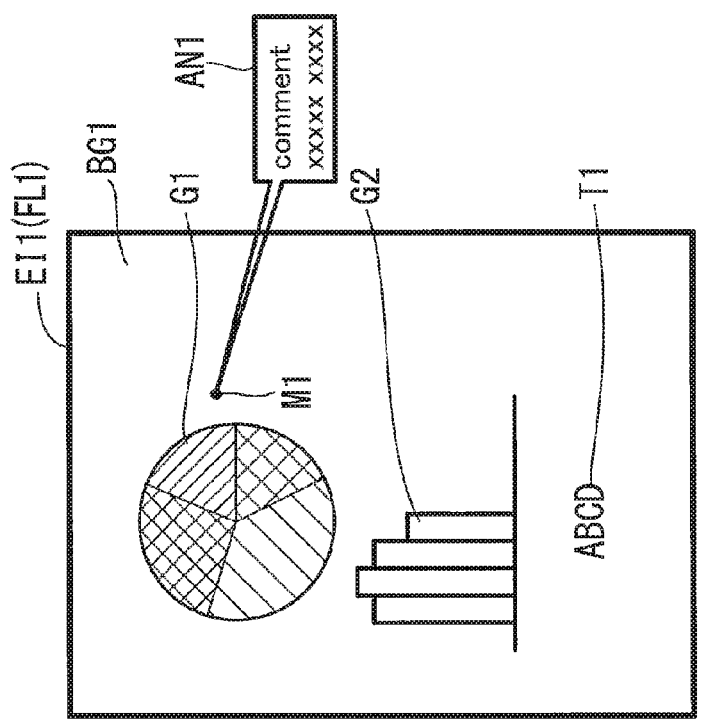
Figure 10:
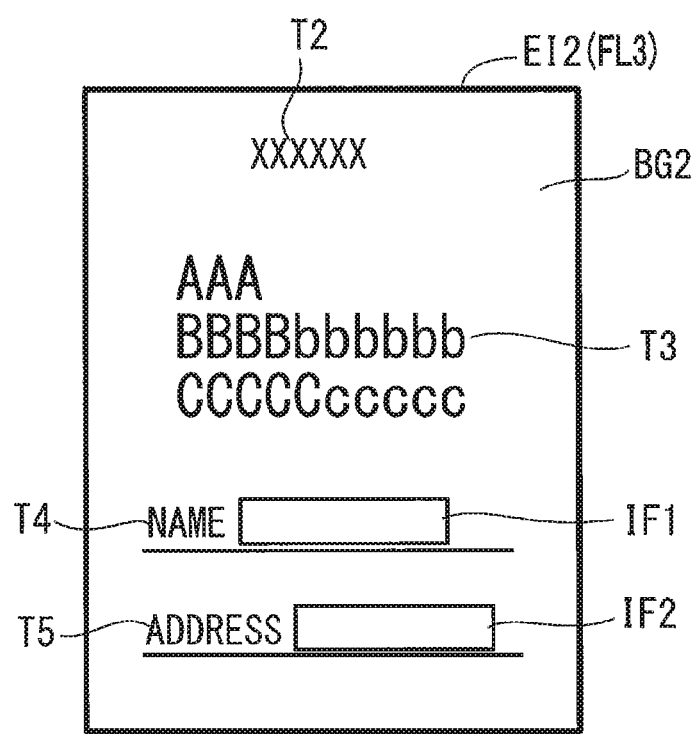
FIG. 10 is a view illustrating an output PDF file displayed using a viewer.

FIGS. 9A and 9B and FIG. 10 are views illustrating the output PDF files displayed using a viewer. FIG. 9A illustrates a display state of the output PDF file FL1 including the page data PD13 shown in FIG. 5C. As illustrated in FIG. 9A, when the output PDF file FL1 is displayed, a partially-erased image EI1 and an annotation text AN1 are displayed on a screen of a terminal device, for example. The partially-erased image EI1 is represented by the partially-erased image data ED stored in the page data PD13 of the output PDF file FL1. That is, the partially-erased image EI11 is obtained by erasing the tag images AI1 and AI2 from the scan image SI1 of FIG. 3A. The annotation text AN1 is represented by the annotation text code TC stored in the page data PD13. The annotation text AN1 represents text (or character) in the tag image AI1 in the scan image SI1 shown in FIG. 3A, that is, text that the user has written on the tag AP1 which the user has attached on the sheet ST1. When the output PDF file FL1 is displayed on the display screen of the terminal device, the partially-erased image EI1 can be displayed simultaneously with the annotation text AN1 as illustrated in FIG. 9A. Further, although not illustrated, when the annotation text AN1 is set to "non-display" in the viewer, only the partially-erased image EI1 is displayed on the display screen. That is, the partially-erased image EI1 can be displayed independently of the annotation text AN1.

The annotation text AN1 shown in FIG. 9A is displayed in association with a specific position on the partially-erased image EI1 through a marker M1 disposed on the partially-erased image EI1. This specific position is a position indicated by the position information included in the annotation text code TC. Further, the specific position with respect to the partially-erased image EI1 corresponds to a position with respect to the scan image at which the tag image AI1 is disposed.

FIG. 9B illustrates a display state of the output PDF file FL2 including the page data PD14 shown in FIG. 5D. As illustrated in FIG. 9B, when the output PDF file FL2 is displayed, the partially-erased image EI1 and an annotation text AN2 are displayed on the screen of the terminal device, for example. The annotation text AN2 is represented by the annotation image data IC stored in the page data PD14. That is, the annotation text AN2 is represented by an image file included in the annotation image data IC. The annotation text AN2 represents graphic in the tag image AI2 in the scan image SI1 shown in FIG. 3A, that is, graphic that the user has written on the tag AP2 which the user has attached onto the sheet ST1. When the output PDF file FL2 is displayed on the display screen of the terminal device using a viewer, the partially-erased image EI1 can be displayed independently from or simultaneously with the annotation text AN2 as in the case of the output PDF file FL1.

The annotation text AN2 shown in FIG. 9B is displayed in association with a specific position on the partially-erased image EI1 through a marker M2 disposed on the partially-erased image EI1. This specific position is a position indicated by the position information included in the annotation image data IC. Further, the specific position with respect to the partially-erased image EI1 corresponds to a position with respect to the scan image at which the tag image AI2 is disposed.

The annotation image data and the annotation text code represent the written target (i.e., text or graphic written on the tag image) specified in the added region. The tag image including the written target is not included in the partially-erased image. The annotation image data and the annotation text code are examples of supplementary information data indicating supplementary information that supplements the partially-erased image in which the tag images have been erased.

FIG. 10 illustrates a display state of an output PDF file FL3 including the page data PD15 of FIG. 5E. As illustrated in FIG. 10, when the output PDF file FL3 is displayed, a partially-erased image EI2 and two input boxes IF1 and IF2 are displayed on the screen of the terminal device, for example. The partially-erased image EI2 is represented by the partially-erased image data ED stored in the page data PD15 of the output PDF file FL3. That is, the partially-erased image EI2 is obtained by erasing the tag images AI3 and AI4 from the scan image SI2 shown in FIG. 3B. The input boxes IF1 and IF2 are text input boxes represented by input form codes FC1 and FC2 stored in the page data PD15. When the output PDF file FL3 is displayed on the display screen of the terminal device, display/non-display of the input boxes IF1 and IF2 can be switched according to user's operation. As illustrated in FIG. 10, in the partially-erased image EI2, the input boxes IF1 and IF2 can be displayed simultaneously with or independently from each other, similarly to the PDF file FL1.

The input boxes IF1 and IF2 have a specific size and are disposed at respective specific positions in the partially-erased image EI2. The specific positions of the input boxes IF1 and IF2 are positions indicated by the position information included in the input form codes FC1 and FC2, respectively. That is, the specific positions with respect to the partially erased image file EI2 correspond to positions in the scan image SI2 with respect to the scan image at which the tag images AI3 and AI4 are disposed. The specific sizes of the input boxes IF1 and IF2 are sizes indicated by the size information included in the input form codes FC1 and FC2, respectively. That is, the specific sizes correspond to the sizes of the respective tag images AI3 and AI4 in the scan image SI2.

According to the embodiment, the CPU 310 acquires the target image data representing the target image (e.g., scan image SI1) including the original image (e.g., original image OI1) on the sheet (e.g., the sheet ST1) and the tag images AI1 and AI2 attached onto the sheet by the user (S210 of FIG. 2). In the added region specifying process shown in FIG. 6, the CPU 310 analyzes the target image data, and then identifies the added regions surrounded by the outer edges of the respective tag images (e.g., tag images AI1 and AI2). In the written target specifying process shown in FIG. 7, the CPU 310 analyzes the partial image data representing the image in the added region included in the target image data, and then identifies the text or graphic included in the added image as the written target. In the file generation process shown in FIG. 8, the CPU 310 generates the partially-erased image data ED and the supplementary image data (e.g., annotation text code TC, annotation image data IC) by using the result of the written target specifying process and the target image data, and then generates the output PDF file including the partially-erased image data ED and the supplementary image data. Accordingly, the written target added onto the sheet can be properly identifies, whereby a user-desired output PDF file can be generated.

For example, there may be a case where the written target is written, not through the tag to be attached (added) on the sheet, but directly on the sheet. In this case, it may be difficult to properly identify the written target by analyzing the scan data. This is because there may be a case where it is difficult to distinguish between an object of the original image on the sheet and written target written by the user. In the embodiment, it is regularized that the user attaches the tag onto the sheet and writes the written target on the tag. The CPU 310 analyzes the target image data to specify the tag image representing the tag. The tag has features that the tag has a specific color (blue, red, yellow, etc.) and has a specific shape (rectangular shape, etc.). Therefore, it is comparatively easy to specify the tag image with accuracy. The CPU 310 specifies the written target by analyzing the partial image data representing the image in the added region defined by the outer edge of the tag image. This can prevent the object in the original image OI1 from being erroneously specified as the written target and occurrence of unspecified written target, whereby the written target can be specified with accuracy. Further, when the written target is not written on the tag, absence of the written target on the tag can be determined with accuracy. As a result, a user-desired output PDF file can be generated.

The CPU 310 specifies the added region by analyzing presence/absence of a region (that is, added region defined by the tag image) surrounded by a closed line (closed curve, loop, surrounding line) constituting the tag image (S320 of FIG. 6). As a result, the tag image (i.e., added region) can be properly specified.

More specifically, the CPU 310 analyzes the target image data to specify the tag image which is the partial image having a prescribed specific color (e.g., red, blue, or yellow) different from the background color (e.g., white) in the target image and specifies a region surrounded by the outer edge of the specified tag image as the added region (S305 to S335 shown in FIG. 6). As a result, the user can easily attach (add) the added image for defining the added region by attaching the tag having a prescribed color onto the sheet. Accordingly, a user-desired output PDF file can be generated with accuracy and with ease.

When the text has been specified in the added region in the written target specifying process shown in FIG. 7, the annotation text code TC including text data representing the text is generated in the file generation process (S530), and the output PDF file including the annotation text code TC is generated (S555). When an image (e.g., graphic) different from the text has been specified in the added region, the annotation image data IC including the image data (image file) representing the specified image in the added region is generated (S535), and the output PDF file including the annotation image data IC is generated (S555). Accordingly, the supplementary information data included in the output PDF file can vary depending on the type of the image (specifically, whether the text is specified) specified in the added region. Thus, an output PDF file including the supplementary information data of a user-desired type can be generated in a flexible manner.

In the written target specifying process of FIG. 7, the text recognition process is executed for the image in the added region (S425) to determine whether the text is recognized (S430). When the text has been recognized in the text recognition process, the output PDF file including the annotation text code TC is generated. On the other hand, when the text has not been recognized in the text recognition process, the output PDF file including the annotation image data IC is generated. Accordingly, the supplementary information data included in the output PDF file can change depending on whether the text is recognized in the added region in the text recognition process. Thus, a user-desired output PDF file can be properly generated.

As illustrated in FIGS. 9A and 9B, when the annotation text AN1 and the annotation image AN2 are displayed simultaneously with the partially-erased image EI1, these are displayed in association with the positions in the target image at which the tag images AI1 and AI2 are disposed, respectively, that is, positions M1 and M2 in the partially-erased image EI1 corresponding to the positions in the target image at which the added regions are disposed. As a result, an output PDF file reflecting the user's intention more faithfully can be generated.

In the written target specifying process of FIG. 7, the written target is specified by specifying the non-background pixels in the added region (S410). When the number of the specified non-background pixels is equal to or greater than the threshold value TH2 (S415: YES), the output PDF file is generated so as to include the supplementary information data (e.g., annotation text code TC or annotation image data IC) representing the written target (e.g., text or non-text) represented by the non-background pixels, in the file generation process shown in FIG. 8. When the number of the specified non-background pixels is less than the threshold value TH2 (S415: NO), the output PDF file is generated so as to include the input form codes FC representing the input boxes IF1 and IF2, in the file generation process of FIG. 8. Accordingly, the attached data included in the output PDF file can change depending on whether the number of the specified non-background pixels in the added region is equal to or greater than a threshold. Thus, an image file desired by the user can be properly generated.

As illustrated in FIG. 10, when the input boxes IF1 and IF2 are displayed simultaneously with the partially-erased image EI2, these fields are disposed at positions in the partially-erased image EI2 corresponding to positions in the target image where the tag images AI3 and AI4 (i.e., corresponding added regions) are disposed. As a result, an output PDF file representing an image in which the input box is disposed at a user-desired position can be easily generated. Specifically, the user only needs to attach a blank tag to a position in the original image on the sheet at which the user wants to locate the input box.

The sizes of the input boxes IF1 and IF2 are determined on the basis of a size of the added region defined by the tag image. Specifically, the sizes of the input boxes IF1 and IF2 in the partially-erased image EI2 are equal to the sizes of the respective tag images AI3 and AI4 in the target image (scan image SI2). Accordingly, the output PDF file can be easily generated so as to represent an image in which the input box of a user-desired size is disposed. Specifically, the user only needs to attach, to the sheet, a tag having a size corresponding to an input box that he or she wants to locate in the original image.

The tag images AI1 to AI4 are examples of the added image. The annotation text AN1 and the annotation image AN2 are examples of the supplementary information. The annotation text code TC and the annotation image data IC are examples of the supplementary information data. The input form code FC is an example of the input box data.

B. Second Embodiment

In the first embodiment, the added region is defined by the outer edge of the tag. In a second embodiment of the present disclosure, the added region is defined by an enclosure line. The enclosure line is a linear image that the user draws on the sheet. The enclosure line surrounds a partial region in the target image. The enclosure line is drawn by a pen of a prescribed specific color (e.g., red, blue, yellow) and has therefore a prescribed specific color.

Figure 11A:
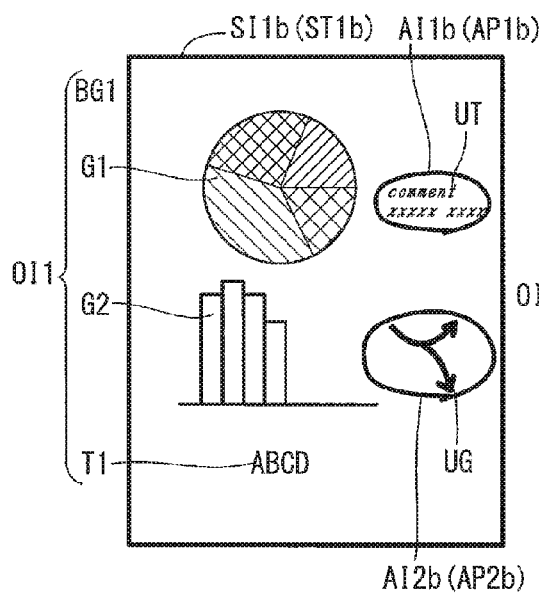
FIGS. 11A and 11B are views illustrating examples of scan images used in a second embodiment.
Figure 11B:
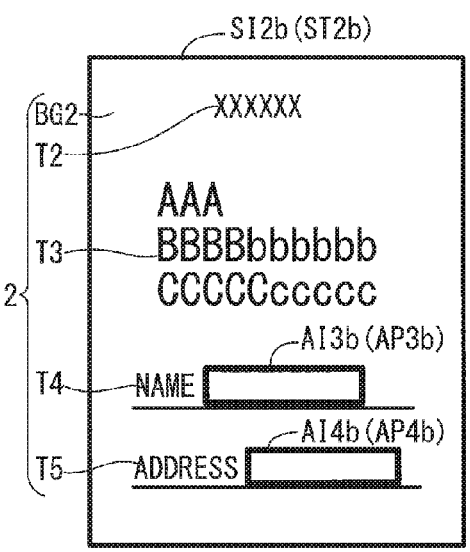

FIGS. 11A to 11D are views illustrating examples of images used in the second embodiment. FIGS. 11A and 11B illustrate scan images SI1b and SI2b, respectively, which are represented by scan data of the second embodiment generated by scanning the sheets ST1b and ST2b, respectively.

As shown in FIG. 11A, the sheet ST1b represents the original image OI1. The text UT and graphic UG as the written targets are written on the sheet ST1b. The text UT and the graphic UG are surrounded by enclosure lines AP1b and AP2b, respectively.

The scan image SI1b is generated by scanning the sheet ST1b on which the enclosure lines AP1b and AP2b, the text UT, and the graphic UG are written. So, the scan image SI1b includes the original image OI1, enclosure line images AI1b and AI2b representing respectively the enclosure lines AP1b and AP2b, the text UT, and the graphic UG.

As shown in FIG. 11B, enclosure lines AP3b and AP4b are written on the sheet ST2b. Each of the enclosure lines AP3b and AP4b is drawn in a rectangular shape by using a ruler, for example. The text and graphic as the written targets are not written inside the enclosure lines AP3b and AP4b.

Thus, the scan image SI2b generated by scanning the sheet ST2b includes the original image OI2 and the enclosure line images AI3b and AI4b representing the enclosure lines AP3b and AP4b.

The added region of the first embodiment is a region defined by the tag image, specifically, a region surrounded by the outer edge of the tag image. In the second embodiment, the added region is a region defined by each of the enclosure line images AI1b to AI4b, specifically, a region surrounded by each of the enclosure line images AI1b to AI4b.

Figure 12:
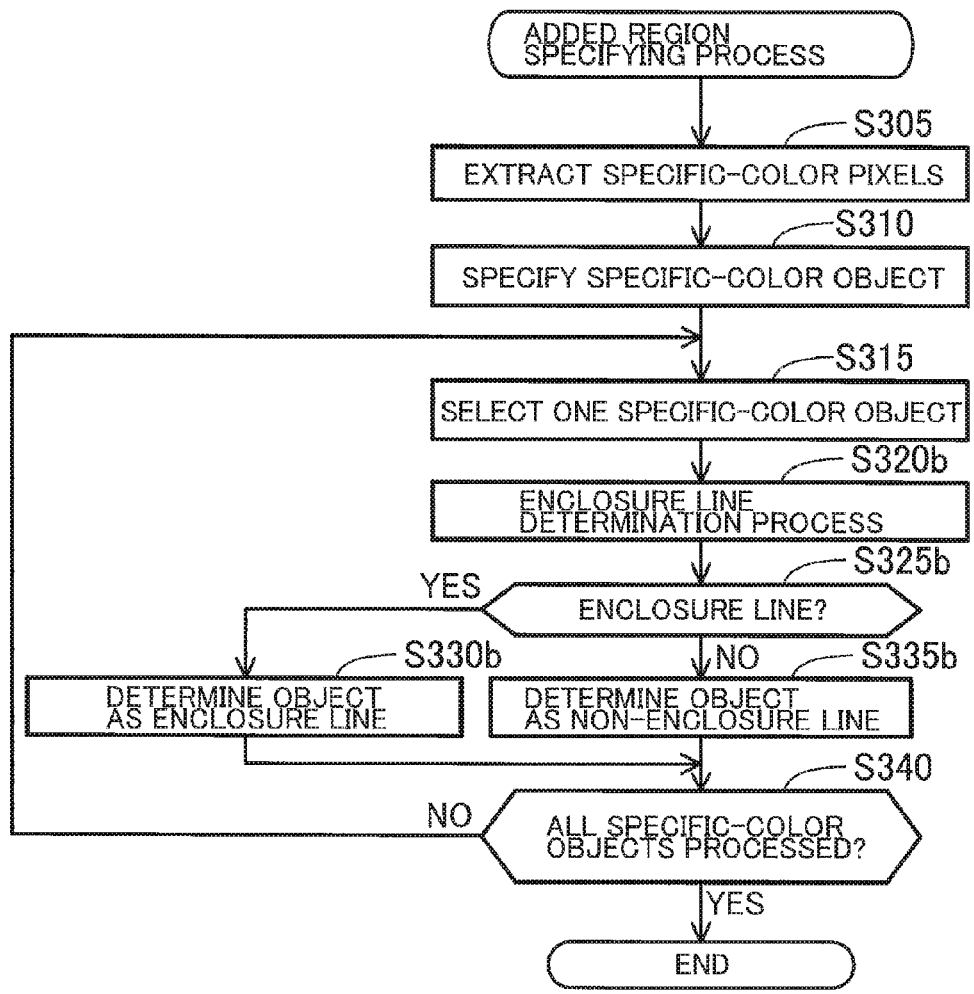
FIG. 12 is a flowchart illustrating an added region specifying process according to the second embodiment.

Thus, the added region specifying process of the second embodiment differs from the added region specifying process (FIG. 6) of the first embodiment. FIG. 12 is a flowchart of the added region specifying process according to the second embodiment. In the added region specifying process shown in FIG. 12, S320b, S325b, S330b, S335b, and S345b are executed in place of S320, S325, S330, S335, and S345 of the added region specifying process shown in FIG. 6.

Figure 11C:
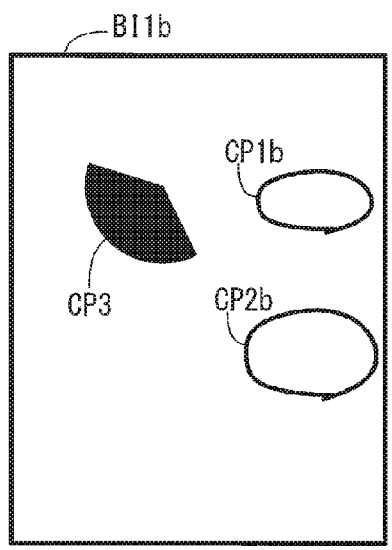
FIGS. 11C and 11D are views illustrating examples of extracted images used in the second embodiment.

In the added region specifying process of the second embodiment, when the scan data representing the scan image SI1b shown in FIG. 11A is the target image data, extracted image data representing an extracted image BI1b illustrated in FIG. 11C is generated at the time of execution of S310. In the extracted image BI1b, specific-color objects CP1b and CP2b corresponding to the enclosure line images AI1b and AI2b and a specific-color object CP3 corresponding to a part of the graphic G1 are specified.

Figure 11D:
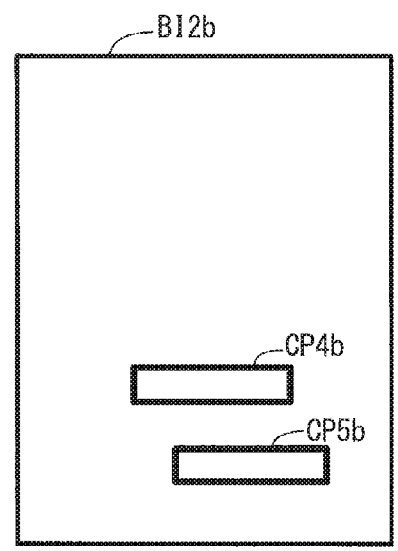

In the added region specifying process of the second embodiment, when the scan data representing the scan image SI2b shown in FIG. 11B is the target image data, extracted image data representing an extracted image BI2b illustrated in FIG. 11D is generated at the time of execution of S310. In the extracted image BI2b, specific-color objects CP4b and CP5b corresponding to the enclosure line images AI3b and AI4b are specified.

In S320b, the CPU 310 executes an enclosure line determination process for the target specific-color object on the basis of the extracted image data. The enclosure line determination process determines whether the specific-color object has a linear shape as the enclosure line image. The enclosure line determination process is performed by using a known method. A method for the enclosure line determination process is disclosed in detail in Japanese Patent Application Publication No. 2014-182622 (Japanese Patent Application No. 2013-57043).

For example, in the enclosure line determination process, the CPU 310 determines whether the target specific-color object represents a line and whether the target specific-color object has a shape surrounding a partial region in the target image. The CPU 310 determines that the target specific-color object is the enclosure line image when the target specific-color object represents a line and has a shape surrounding a partial region in the target image.

First, a determination of whether the target specific-color object represents a line will be described. Specifically, the CPU 310 identifies a rectangular region that circumscribes the target specific-color object. Then, the CPU 310 calculates, for each of a plurality of Y-direction (vertical direction in the embodiment) lines in the rectangular region, the number (continuous pixel number RN) of continuous specific-color pixels. Then, the CPU 310 calculates an average value RNave1 of the continuous pixel numbers RN of the plurality of lines. When the target specific-color object represents a line, the average value RNave1 becomes a comparatively small value falling within a specific range corresponding to a width of the line. So, the CPU 310 determines whether the average value RNave1 falls within a first specific range. Similarly, the CPU 310 calculates, for each of a plurality of X-direction (horizontal direction in the embodiment) lines in the rectangular area, the continuous pixel number RN and calculates an average value RNave2 of the continuous pixel numbers RN of the plurality of lines. Then, the CPU 310 determines whether the average value RNave2 falls within a second specific range. The second specific range may be the same as the first specific range. Then, the CPU 310 determines that the target specific-color object represents a line when both the average value RNave1 and average value RNave2 for the Y- and X-directions fall within their corresponding specific ranges, respectively.

Next, a determination of whether the target specific-color object has an enclosure shape surrounding a partial region in the target image will be described. The CPU 310 sets a determination frame for each of a plurality of specific-color pixels constituting the target specific-color object. The determination frame is used for this determination. Each determination frame is a square frame with a center thereof at the specific-color pixel for which the frame is set. Vertical and horizontal sizes of the frame are, for example, previously set to about 1/10 of vertical and horizontal sizes of an assumed enclosure line. The CPU 310 counts the number of intersections between the set frame and the target specific-color object for each specific-color pixel. When the target specific-color object has the enclosure line, the number of intersections should be two in all the specific-color pixels. Actually, there may be a case where the enclosure line is partly cut or where noise is included. So, the CPU 310 calculates a ratio, to total number of the specific color pixels, of the number of specific-color pixels for which the number of intersections is two. When the calculated ratio is larger than or equal to a reference ratio, the CPU 310 determines that the target specific-color object has the enclosure shape.

In S325b, the CPU 310 determines that a result of the enclosure line determination process indicates that the target specific-color object is the enclosure line image. When the target specific-color object is the enclosure line image (S325b: YES), in S330b the CPU 310 determines that the target specific-color object is the enclosure line image, and stores information indicating a position, a size, and a color of the determined enclosure line image in the volatile storage 320. When the target specific-color object is not the enclosure line image (S325b: NO), in S335b the CPU 310 determines that the target specific-color object is not the enclosure line image.

As described above, in added region specifying process, the enclosure line image is specified as the added image. Then, a partial image in the target image surrounded by the enclosure line image is identified as the added region, and this added region is used to execute the written target specifying process shown in FIG. 7 and the file generation process shown in FIG. 8.

According to the second embodiment, the enclosure line image is specified as the added image (FIGS. 11A and 11B), by analyzing the target image data. The enclosure line image is an image of a line surrounding a partial region in the target image and having a prescribed color. Then, the partial region in the target image surrounded by the enclosure line image is specified as the added region. As a result, by surrounding an area in the sheet using a pen of a prescribed color, the user can easily attach the added image to the sheet. As a result, the image processing apparatus can easily generate an output PDF file including a user-desired image and user-desired attached data (supplementary information data or input box data).

C. Modifications (1) In the first embodiment, the added region of the target image (scan image) is the region defined by the tag image. In the second embodiment, the added region of the target image is the region defined by the enclosure line image. Generally, the added region may be a region within the target image surrounded by a closed line (closed line, closed curve, loop, or surrounding line) (e.g., outer edge (outline) of the tag image or enclosure line image itself) constituting the added image (e.g., the tag image or the enclosure line image) that the user added on the sheet.

(2) In the above embodiments, the annotation text code TC and the annotation image data IC are shown as examples of the supplementary information data, but the present disclosure is not limited thereto. The supplementary information data may be a voice code representing voice indicating text as the written target in the added region or may be a highlight code for highlighting text in the added region. Generally, it is only necessary that the supplementary information represented by the supplementary information data can be reproduced (displayed or voice-output) in selective one of a simultaneous manner with the partially-erased image and an independent manner from the partially-erased image. That is, in simultaneous manner, the partially-erased image the supplementary information are reproduced simultaneously while in the independent manner, the partially-erased image the supplementary information are reproduced independently.

(3) In the above embodiments, the annotation image data IC includes image data representing only the image in the corresponding added region. Alternatively, the annotation image data IC may be image data representing the entire scan image, i.e., the target image data itself. In this case, when there is any added region including at least one non-text in the target image, the CPU 310 may output an output PDF file including: the annotation image data IC including the target image data itself; and the partially-erased image data. In this case, the output PDF file may not include the supplementary information data corresponding to the image in another added region.

(4) In the above embodiments, the supplementary information (e.g., the annotation text AN1 or the annotation image AN2) represented by the supplementary information data is associated with the specific position in the target image. Alternatively, the annotation text AN1 or the annotation image AN2 may be associated only with the target image but need not be associated with a specific position in the target image. For example, the supplementary information may be associated with a center position of the image irrespective of the position of the added image.

(5) In the first embodiment, when one target image includes tag images of a plurality of specific colors, a plurality of output PDF files is generated. Alternatively, even when one target image includes a plurality of tag images of a plurality of specific colors, the CPU 310 may generate only one output PDF file. In this case, the CPU 310 may generate, for each of the tag images of a plurality of specific colors, corresponding attached data (supplementary information, input box data, etc.) without discriminating between the plurality of tag images of a plurality of specific colors, and store the plurality of generated attached data in one output PDF file. More specifically, in FIG. 8, S505 is skipped, and the CPU 310 may select, in S510 of FIG. 8, all the added regions as the target added region.

(6) In the first embodiment, the tag image is specified under conditions that it has a specific color and a specific shape (specifically, rectangular shape). Alternatively, the tag image may be specified only under a condition that it is a solid area having a specific color. That is, analysis concerning the shape need not be performed for specifying the tag image. In this case, a tag having an arbitrary shape (e.g., a circular shape, a star shape) can be used.

(7) In the above embodiments, the input PDF file includes scan data corresponding to one page. Alternatively, the input PDF file may include scan data corresponding to M pages obtained by reading M (M is an integer equal to or greater than 2) sheets. In this case, the processing of S220 to S240 of FIG. 2 may be executed for each of the target images (scan images) corresponding to M pages to generate an output PDF file including partially-erased images corresponding to M pages and respective supplementary information.

(8) The input file and the output file are the input PDF file or the output PDF file of the embodiments. Alternatively, another format may be used for an image file, such as the input file and the output file. For example, in place of the input PDF format, an image file of arbitrary format, such as a JPEG format file or a TIFF format file, may be used. Further, in place of the output PDF file, an image file of another format may be used. In this case, the image file of another format can store the supplementary information data and image data in an independent manner, and can reproduce an image represented by the image data and supplementary information represented by the supplementary information in both a simultaneous manner and an independent manner. That is, in the simultaneous manner, the image and the supplementary information are produced simultaneously. In the independent manner, the image and the supplementary information are produced independently. For example, a page description language image file, such as an XPS (XML Paper Specification) may be used. Here, the page description language image file can store annotation data representing an annotation separately from the image data.

(9) In the embodiments, the target image data is the scan data optically read by the reading unit 160. However, the present disclosure is not limited to this. For example, the target image data may be image data optically read by a digital camera.

(10) The image processes (S220-S240, for examples) that the server executes in the above embodiments may be performed by an apparatus different from the server 300, such as, a digital camera, a scanner, a personal computer, and a mobile phone. Further, the server 300 may include a plurality of apparatuses (for example, computers) communicable with each other via a network. The plurality of apparatuses may perform respective part of each image process executed by the server 300.

At least part of the processes implemented in hardware in the embodiment may be replaced with software processes, while conversely at least part of the processes implemented in software may be replaced with a hardware configuration. For example, at least part of the image processes executed by the server 300 may be achieved by a dedicated hardware circuit including a logical circuit.

Any combination of the processes described in the first and second embodiment can be used.

When all or part of the functions in the present disclosure are implemented by computer programs, the programs can be stored on a computer-readable storage medium (a non-temporary storage medium, for example). The programs may be used from the same storage medium on which they are provided (an example of a computer-readable storage medium), or may be first loaded onto a different storage medium (an example of a computer-readable storage medium). The "computer-readable storage medium" may be a portable medium, such as a memory card or CD-ROM; an internal storage device built into the computer, such as any of various ROM; or an external storage device, such as a hard disk drive connected to the computer.

While the disclosure has been described in detail with reference to the above embodiments thereof, it would be apparent to those skilled in the art that various changes and modifications may be made therein.

What is claimed is:

1. An image processing apparatus comprising:
 a processor; and
 a memory storing computer-readable instructions therein, the computer-readable instructions, when executed by the processor, causing the image processing apparatus to perform:
   acquiring target image data generated by optically reading a sheet, the target image data representing a target image including an original image on the sheet and an added image, the added image being added on the sheet;
   specifying, from the target image, an added region surrounded by a surrounding line constituting the added image by analyzing the target image, the added region including the added image;
   specifying a written target in the added region by analyzing partial image data representing an image inside the added region;
   generating partially-erased image data and supplementary data by using the target image data and a result of the specifying of the written target, the partially-erased image data representing a partially-erased image that is based on the target image with an image inside the added region being erased, the supplementary data indicating supplementary information concerning the added image to supplement the partially-erased image; and generating an image file including the partially-erased image data and the supplementary data in a specific format so that the partially-erased image and supplementary information are capable of being reproduced in selective one of a simultaneous manner and an independent manner, in the simultaneous manner the partially-erased image and the supplementary information being reproduced simultaneously, and in the independent manner the partially-erased image being reproduced and the supplementary information not being reproduced.

2. The image processing apparatus according to claim 1, wherein the added region is specified by determining whether there is a region surrounded by the surrounding line in the target image.

3. The image processing apparatus according to claim 1, wherein the specifying of the added region includes:

specifying, as the added image, a partial image of the target image having a specific color different from a background color of the target image by analyzing the target image data; and specifying a region surrounded by an outline of the added image as the added region.

4. The image processing apparatus according to claim 1, wherein the specifying of the added region includes:

specifying, as the added image, a line image representing a line surrounding a part of the target image and having a specific color by analyzing the target image data; and specifying a partial region included in the target image and surrounded by the line image as the added region.

5. The image processing apparatus according to claim 1, wherein when the written target is specified as a character, the generating generates the image file including first supplementary data including character information indicating the specified character; and wherein when the written target is not specified as the character, the generating generates the image file including second supplementary data including image data representing the written target.

6. The image processing apparatus according to claim 5, wherein the specifying of the written target includes performing a character recognition process on an image in the added region to recognize a character in the added region; and wherein the image file including the first supplementary data is generated when the character is recognized in the added region whereas the image file including the second supplementary data is generated when no character is recognized in the added region.

7. The image processing apparatus according to claim 6, wherein when the partially-erased image and the supplementary information are reproduced in the simultaneous manner, the supplementary information is associated with a position with respect to the partially-erased image corresponding to a position of the added region with respect to the target image.

8. The image processing apparatus according to claim 1, wherein the specifying of the written target includes specifying an image different from a background of the added image by specifying non-background pixels in the added region, the non-background pixels specifying color different from color of a pixel in the background;

wherein when a number of specified non-background pixels is greater than or equal to a prescribed threshold value, the supplementary data is generated to indicate information indicated by the number of specified non-background pixels; and wherein where a number of specified non-background pixels is smaller than the prescribed threshold value, the supplementary data is generated to include input box data indicating an input box to receive an input of a user, the input box being disposed in the partially-erased image when the partially-erased image and the supplementary information are reproduced.

9. The image processing apparatus according to claim 8, wherein when the partially-erased image and the supplementary information are reproduced in the simultaneous manner, the input box is disposed at a position with respect to the partially-erased image corresponding to a position of the added region with respect to the target image.

10. The image processing apparatus according to claim 9, wherein a size of the input box is determined on a basis of a size of the added region.

11. The image processing apparatus according to claim 1, wherein the target image data represents the target image including a first added image having a first color and a second added image having a second color;

wherein the computer-readable instructions, when executed by the processor, causes the image processing apparatus to further perform:

specifying a first added region defined by the first added image and a second added region defined by the second added image; and generating a first image file and a second image file as the image file;

wherein the first image file includes the partially-erased image data and first supplementary data concerning the first added image; and wherein the second image file includes the partially-erased image data and second supplementary data concerning the second added image.

12. A non-transitory computer readable storage medium storing a set of program instructions thereon that, when executed by a computer, cause the computer to perform operations comprising:

acquiring target image data generated by optically reading a sheet, the target image data representing a target image including an original image on the sheet and an added image, the added image being added on the sheet;

specifying, from the target image, an added region surrounded by a surrounding line constituting the added image by analyzing the target image, the added region including the added image;

specifying a written target in the added region by analyzing partial image data representing an image inside the added region;

generating partially-erased image data and supplementary data by using the target image data and a result of the specifying of the written target, the partially-erased image data representing a partially-erased image that is based on the target image with an image inside the added region being erased, the supplementary data indicating supplementary information concerning the added image to supplement the partially-erased image; and generating an image file including the partially-erased image data and the supplementary data in a specific format so that the partially-erased image and supplementary information are capable of being reproduced in selective one of a simultaneous manner and an independent manner, in the simultaneous manner the partially-erased image and the supplementary information being reproduced simultaneously, and in the independent manner the partially-erased image being reproduced and the supplementary information not being reproduced.

* * * * *